United States Patent [19]

Smith

[11] 4,299,526
[45] Nov. 10, 1981

[54] BATTERY CHANGING APPARATUS

[75] Inventor: John W. Smith, Columbus, Ohio

[73] Assignee: Dresser Industries, Inc., Dallas, Tex.

[21] Appl. No.: 39,528

[22] Filed: May 16, 1979

[51] Int. Cl.³ .................... B61K 11/00; B65G 67/02
[52] U.S. Cl. .................................. 414/392; 104/34;
            414/399; 414/589; 414/744 R
[58] Field of Search ............... 414/222, 223, 267, 347,
     414/352, 373, 391, 392, 399, 564, 589, 592, 609,
            662, 672, 744 R, 749, 751; 180/65.5; 104/34

[56] References Cited
U.S. PATENT DOCUMENTS

| | | | |
|---|---|---|---|
| 1,421,009 | 6/1922 | Inman | 104/46 |
| 1,858,768 | 5/1932 | Ellstrom | 104/34 |
| 3,307,720 | 3/1967 | Davis et al. | 414/564 |
| 3,880,294 | 4/1975 | Arseneault | 414/751 |

Primary Examiner—Robert G. Sheridan
Attorney, Agent, or Firm—John M. Lorenzen; Paul E. Krieger

[57] ABSTRACT

A battery changing apparatus for replacing a spent battery with a charged one on an electrically powered vehicle including a support with at least two battery support sections for supporting batteries adapted for use on an electrically powered vehicle. A spent battery is removed from the vehicle and transferred to one of the support sections. The relative positions of the apparatus for removing and transferring the battery and the support can be changed so that a charged battery can be removed from another support section. The apparatus for removing and transferring the battery can remove the charged battery from the other support and transfer it to the vehicle.

4 Claims, 4 Drawing Figures

BATTERY CHANGING APPARATUS

BACKGROUND OF THE INVENTION

This invention relates to battery powered vehicles and, more particularly, to an apparatus which can be used to remove a spent battery from a vehicle in an underground coal mine and replace it with a charged battery.

Underground coal mine vehicles are normally operated by electrical power which can be supplied by batteries as an alternative to providing power through an unwieldy power line. The capacity of such batteries is normally designed to be great enough so that a machine may be operated for an entire shift before the battery needs to be charged. After each shift, spent batteries are normally removed from the machine and replaced by charged batteries and the spent batteries are charged for use on the next shift. Mine car batteries require special handling considerations since a single car can utilize two batteries weighing over 3,000 lbs. a piece which are contained in a steel casing.

Various ways of mechanically replacing spent batteries have been developed such as the hydraulic transfer mechanism in U.S. Pat. No. 3,799,063 and the hydraulic jacks in U.S. Pat. No. 3,336,997 which remove a battery and position it on a sled for holding the batteries for charging.

Both of these procedures, however, require power cables to be attached to the vehicle so that it can be driven to another location in the mine where a charged battery can be loaded. This is necessary because of the nature of underground mining operations in the United States which use the room and pillar method where mine car entries are normally only narrow enough to accommodate a set of batteries from one vehicle.

Once a battery is removed to the mine floor or sled, it is usually charged at that location so the heavy battery does not have to be moved about in the mine. Since the distance between adjacent entries can be 40-45 feet, relatively long lengths of cables for moving the mine vehicles are required and a separate battery charging station must be maintained in each entry which necessitates fire-proofing each entry as well as providing adequate ventilation. It has also been found that when sleds are used they are often bumped out of position and must be dragged back into position.

SUMMARY OF THE INVENTION

The problems discussed above have been solved by the overall battery changing apparatus which is the subject of this invention and provides for replacing a spent battery with a charged one in a single mine entry and accommodates two mine cars. A copending application Ser. No. 39,536, filed on May 16, 1979 now abandoned, owned by the same entity which owns this invention relates specifically to a raising and lowering mechanism for the battery changing apparatus.

In accordance with the instant invention, the battery changing apparatus includes a rotary turntable with at least two and preferably three battery support sections, the turntable being rotatable so that after a spent battery is placed on one of the support sections the turntable can be rotated to position a charged battery for transfer to a mine vehicle.

The apparatus also includes a traveling removal and transfer platform which can move back and forth between the mine vehicle and turntable. The invention is especially adapted to be used with a mine vehicle support frame and cooperating battery casing such as shown and described in U.S. Pat. No. 3,336,997, where the bottom side of the battery compartment is open so that the platform can move beneath the casing. The platform can be raised and lowered for lifting the casing off of the mine vehicle and lowering it onto support sections of the turntable where lugs projecting from the sides of the casing will engage the support sections when the platform is lowered.

A charged battery can be transferred to the mine vehicle simply by reversing the operation after the turntable has been rotated for placing a charged battery in the path of the platform.

In this way, the invention provides for changing mine vehicle batteries while the vehicle remains in one location, which saves time by eliminating the need to attach power cables to the vehicle and moving it to another entry. Since the turntable can be rotated so that a spent battery can be moved out of position and a charged one into position for transfer to the mine machine, the charging and transfer functions can be performed in a single entry which eliminates the need for a battery charging station to be established in multiple entries which reduces costs since only one entry needs to be fire-proofed and ventilated. Further, when a turntable with a three battery capacity is used one entry can service two mine vehicles by holding two charging battery sets at the same time.

BRIEF DESCRIPTION OF THE DRAWINGS

These and other objects of the invention will become more apparent when a detailed description of a preferred embodiment set forth below is considered in conjunction with the accompanying drawings in which.

DETAILED DESCRITPION OF A PREFERRED EMBODIMENT

Figure 1:
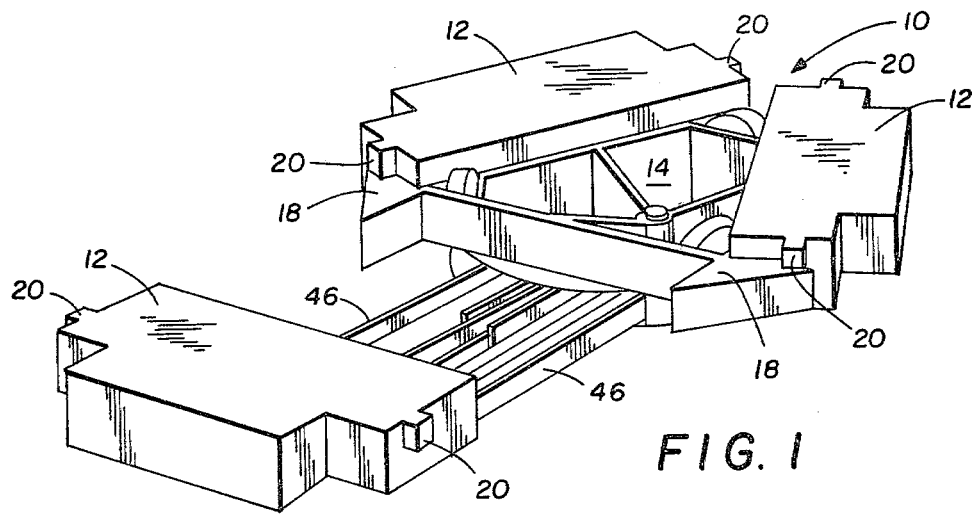
FIG. 1 is a perspective view of the battery changing apparatus which shows in particular two battery casings being supported by a turntable while a third battery is mounted on a platform table in the vicinity of a mine vehicle (not shown)

Referring to FIG. 1, a battery changing apparatus designed in accordance with the invention and designated generally by reference numeral 10 is shown supporting two battery units 12 on a turntable 14 of the apparatus 10. A third battery unit 12 is shown supported on a platform 16 of the apparatus 10, the platform 16 being shielded in FIG. 1 by the battery unit 12 but shown in detail in FIG. 2. As will be described below, the platform can be moved outward to the position shown in FIG. 1 and then raised to lift and remove a battery unit 12 from a mine vehicle (not shown). The platform 16 is then retracted to where it can be lowered to transfer the battery unit 12 onto support sections 18 of the turntable 14. The turntable 14 is then rotated so that a charged battey unit 12 will be positioned to where the platform can again be raised to lift the charged battery unit from the turntable and transfer it to the mine vehicle.

Each of the battery units 12 can be in the form of an outer support casing formed of steel which has two inner compartments (not shown), each one holding a chargeable storage battery which weighs over 3,000 pounds. The mine vehicle (not shown) is designed with a support frame for holding the battery casing in place, the support frame being open in the middle so that the platform 16 can engage the bottom of the casing and lift it. Each battery casing has a pair of support lugs or ears 20 projecting from its sides along an axis intersecting the center of gravity of the unit when the batteries are in place for engaging the mine vehicle support frame and the support sections 18 on the turntable 14.

Figure 2:
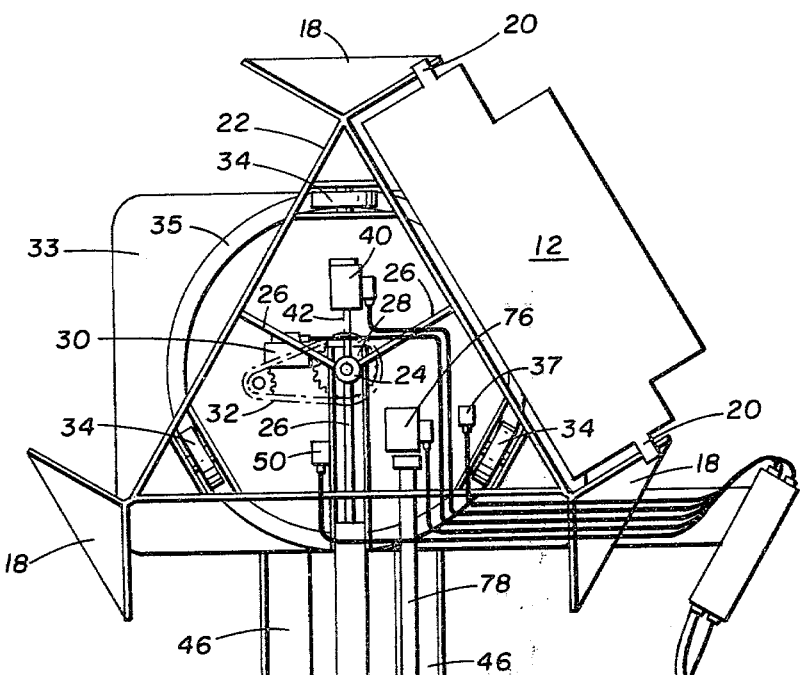
FIG. 2 is a schematic view of the battery changing apparatus of FIG. 1.

Referring to FIG. 2, the platform 16 is shown in its extended outermost position and the turntable 14 is supporting a single battery unit 12. The turntable 14 is formed of a triangularly-shaped support frame 22 to which the support sections 18 are rigidly connected. The frame 22 is connected to a shaft 24 through radial ribs 26, a sprocket 28 being connected to the shaft 24 which is driven by an electric motor 30 through a drive chain 32 for rotating the frame 22. The frame 22 is supported on a stationary base 33 through a plurality of wheels 34 which are rotatably mounted on the frame 22 and engage a track 35 located on the upper portion of the base 33. The motor 30 can be actuated by a button located on a hand-held control unit 36 for selectively rotating the turntable 14, a limit switch 37 being positioned to be tripped by one of several projections (not shown) located on the turntable 14 so that the turntable 14 will automatically stop its rotation at preselected positions. Other ways of rotating the turntable 14 could be utilized such as, for example, a manually-operable crank (not shown).

The platform 16 is shown in FIG. 2 in its extended outermost position to where it can lift a battery unit 12 from a mine vehible or lower one into place. The platform 16 is connected to a shaft 38 which is moved in and out relative to the turntable 14 as indicated by an arrow 39 by means of an electric motor 40, an output shaft 42 of the motor 40 being threaded at its outer end (not shown) for engaging a nut (not shown) rigidly held in place in the shaft 38 which is U-shaped in cross-section, so that when the shaft 42 is rotated engagement between the threads on the shaft 42 and the nut held by the U-shaped shaft 38 will cause the platform to move inwardly and outwardly relative to the turntable 14. The motor 40 can be selectively actuated through the control panel 36, with an override microswitch 50 being provided to prevent rotation of the turntable 14 until the platform 16 is moved outwardly away from the turntable 14 a predetermined safe distance. Other microswitches can be provided for automatically stopping movement of the platform 16 when it reaches both its inner and outer limits of travel.

Figure 3:
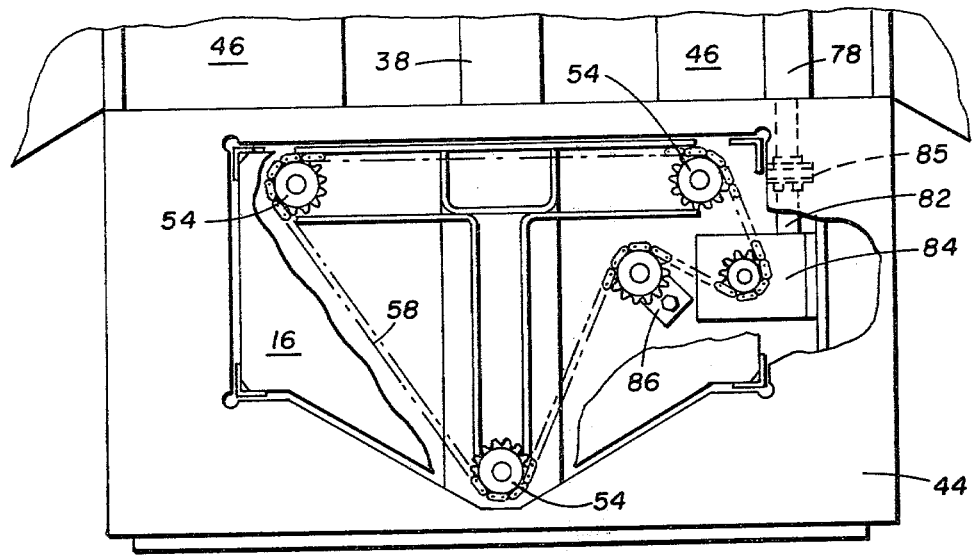
FIG. 3 is a top plan view of the components of a platform which is used for raising and lowering the batteries.

The mechanism for raising and lowering the platform 16, as shown in FIG. 3, is located in a housing 44 which itself is mounted for movement along tracks formed of angle irons 46 located on both sides of the platform 16. Guideways 48 are connected on the outer side of the angle irons 46 for receiving the wheels of a mine vehicle and guiding them to an appropriate location as indicated by arrows 49 for replacement of the battery unit 12.

In order to lift the battery unit 12 from the mine vehicle or turntable 14, a lifting mechanism shown in detail in FIG. 3 is used which includes the platform 16 being connected to a bottom plate 52 of the housing 44 through three screw jacks designated generally by reference numeral 54.

Figure 4:
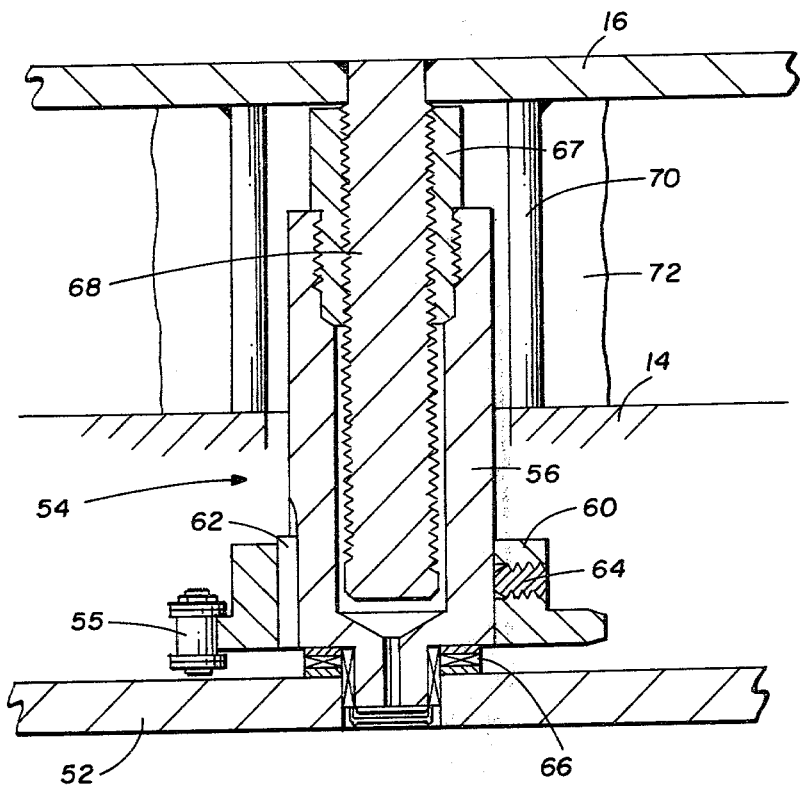
FIG. 4 is a sectional view of one of the screw jacks used for raising and lowering the platform of FIG. 3.

Each screw jack 54, as shown in detail in FIG. 4, includes a main shaft 56 which is driven by a chain 58 through a sprocket 60 that is rigidly connected to the shaft 56 by a key 62 and set screw 64. The shaft 56 is rotatably held in the base 52 through appropriate bearings generally designated by reference numeral 66. At the top end of the shaft 56 an inner shaft 68 is connected which is threaded on its inner surface to mate with threads located on the outer surface of a jack section 68 which is rigidly connected to the platform 16. The platform 16 is prevented from rotating relative to the housing 44 by tubes 70 connected to the underside of the platform 16 engaging ribs 72 connected to the housing 44. The bottom end of the tubes 70 engage a stop 74 when the platform 16 is in its lowered position to prevent the platform from being lowered too far.

Thus, as the chain 58 drives the sprocket 62, the upper shaft 67 will rotate with its threads meshing with the threads on the jack portion 68 which is held stationary to the platform 16 thereby causing the jack portion 68 to raise and lower the platform depending on the direction of rotation of the shaft 56.

As shown best in FIG. 2, an electric motor 76 which is selectively controlled through the hand-held control unit 36 operates to raise and lower the platform 16 by rotating a shaft 78 through an appropriate belt and pulley or gear connection to the output shaft of the motor 76, the shaft 78 being square and of a telescoping-type design to accommodate the in and out movement of the platform 16.

As shown in FIG. 3, the shaft 78 is connected through an appropriate joint 80 to the input shaft 82 of a gear reducer generally designated by reference numeral 84 which operates to move the chain 58 for rotating the shaft 56 of the screw jacks 54. As shown in FIG. 3, the chain 58 engages the sprocket 60 of three appropriately spaced screw jacks 54, a tensioner 86 being provided for maintaining appropriate tension in the chain 58. A pair of microswitches (not shown) are provided in the path of movement of a portion of the platform 16 for limiting its upper and lower limits of travel.

As can be seen, when a battery on a mine vehicle needs to be replaced, the mine vehicle is driven to where the battery unit 12 is located over the position of the platform 16 as shown in FIG. 2 and is aligned by driving the wheels into the guide channels 48. The battery unit 12 is then lifted from the mine vehicle by raising of the platform 16 as described above, the platform then being retracted to a position adjacent the turntable 14 and lowered for positioning the battery casing 12 on the support sections 18 of the turntable 14. The turntable 14 is rotated so that a casing with charged batteries will be positioned over the platform 16. The platform 16 is again raised for lifting the battery casing 12 from the support sections 18, the platform 16 then being moved outwardly in a position relative to the mine vehicle so that when the platform 16 is again lowered the battery casing 12 will be deposited on the mine vehicle.

In this way, a single turntable 14 can be used to service two separate mine vehicles since two battery units 12 can be charged at the same time. Since a battery unit normally lasts one 8-hour shift, two cars with spent batteries at the end of a shift can drive to the turntable 14, deposit the spent batteries and receive charged ones, the turntable 14 then holding the two spent battery units for charging. In this way, the cost of fire-proofing and providing separate ventilation barriers for at least two additional entries are eliminated. In addition, there is no need for extra movement of the mine vehicle between entries which reduces the amount of time required for changing batteries, increasing the efficiency of the changing operation.

It should be understood that one with ordinary skill in the art will be able to make modifications and improvements to the invention described above and that all such modifications and improvements are contemplated as falling within the scope of the appended claims.

The embodiments of the invention in which an exclusive property or privilege is claimed are defined as follows:

1. A battery changing apparatus for replacing a spent battery with a charged one, which is particularly suitable for servicing electrically powered vehicles in an underground mine, comprising:

a turntable having a stationary base, and a support rotatably mounted on said base and having two or more battery receiving and supporting stations;

a battery transfer means located in association with the turntable and having elevatable means for lifting a battery free of a vehicle or battery support station and reciprocatory means for moving said elevatable means into position relative to the turntable wherein said elevatable means can lower said battery into one of said battery support stations, wherein said battery transfer means can be used alternatively for lifting a battery free of the turntable support, moving it into position relative to a vehicle and lowering it onto said vehicle; and means for selectively rotating the turntable to position a selected battery support station in assocation with the battery transfer means.

2. The apparatus of claim 1, wherein the turntable has three battery support sections.

3. The apparatus of claim 2, wherein the turntable includes a triangular frame and support section portions connected at each corner of the frame, the portions being spaced apart and each one including a ledge for holding lugs projecting from the sides of a battery casing located between spaced-apart portions.

4. A battery changing apparatus for replacing a spent battery with a charged one, which is particularly suitable for sevicing electrically powered vehicles in an underground mine, comprising:

a turntable having a stationary base, and a support rotatably mounted on said base and having two or more battery receiving and supporting stations;

a battery transfer means located in association with the turntable for lifting a battery free of a vehicle, moving it into position relative to the turntable and lowering it into one of said battery support stations or alternatively for lifting a battery free of the turntable support, moving it into position relative to a vehicle and lowering it onto said vehicle, said reciprocating battery transfer means includes a platform, means for selectively raising and lowwering the platform, and means for selectively moving the platform from an inner position adjacent the turntable to an outer position adjacent a vehicle; and means for selectively rotating the turntable to position a selected battery support station in association with the battery transfer means.

\* \* \* \* \*